United States Patent Office 2,899,407
Patented Aug. 11, 1959

2,899,407

CURING OF EPOXY RESINS

Henry A. Cyba, Chicago, Ill., assignor, by mesne assignments, to Universal Oil Products Company, Des Plaines, Ill., a corporation of Delaware No Drawing. Application October 3, 1956
Serial No. 613,606

7 Claims. (Cl. 260—47)

This invention relates to the curing of epoxy resins and more particularly to the use of a novel curing agent therefor.

Epoxy resins are more or less of recent origin and have been found to be of great utility in numerous applications. These resins are useful as bonding agents and laminates as, for example, in the lamination of glass, cloth, in bonding metal to metal, metal to wood, wood to wood, etc. The resin also is used in plastic tooling, insulation, paints, protective coatings, etc. Regardless of the particular use, the epoxy resins are furnished as viscous liquids, semi-solids or solids, and subsequently are cured by heating in the presence of a suitable curing agent.

The epoxy resins are formed by the reaction of a 1,2-epoxy compound and a dihydric phenol. The preferred 1,2-epoxy resins are prepared by the reaction of epichlorhydrin with Bis-Phenol-A (2,2-bis-(4-hydroxyphenyl)-propane), generally in alkaline solution. Epoxy resins also are prepared from other 1,2-epoxy compounds including, for example, polyglycidyl ethers of ethylene glycol, propylene glycol, trimethylene glycol, diethylene glycol, triethylene glycol, glycerol, dipropylene glycol, etc. Similarly, other dihydric phenols may be employed, including resorcinol, catechol, hydroquinone, 4,4'-dihydroxybenzophenone, 1,1-bis-(4-hydroxyphenyl)-ethane, 1,1-bis-(4-hydroxyphenyl)-butane, 2,2 - bis - (4-hydroxyphenyl)-butane, 1,5-dihydroxynaphthylene, etc. It is understood that the epoxy resins formed from the various reactants mentioned above are not necessarily equivalent and, furthermore, that the exact composition of the epoxy resins are dependent upon the molecular proportions of the epoxy compound and dihydric phenol employed in its preparation.

Regardless of the method of preparation, the epoxy resin must be cured in order to form the desired final product. In many cases, the epoxy resin is recovered as a viscous liquid and is converted by curing into a final hard product. In other cases, the epoxy resin is a semi-solid or solid which is soluble in suitable organic solvents or liquefied by mild heating and then is converted into the desired final product by proper curing. As hereinbefore set forth, the present invention provides a novel agent for use in the curing of epoxy resins.

In accordance with the present invention, curing of the epoxy resins is effected in the presence of a curing agent comprising a diaminodiphenyl ether or sulfide and alkylated derivatives thereof.

In a preferred embodiment the curing agent comprises a 4,4'-diaminodiphenyl ether and alkylated products thereof. Illustrative compounds in this class include 4,4'-diaminodiphenyl ether, 4,4'-dimethylaminodiphenyl ether, 4,4'-diethylaminodiphenyl ether, 4,4'-dipropylaminodiphenyl ether, 4,4'-dibutylaminodiphenyl ether, 4,4'-diamylaminodiphenyl ether, 4,4'-dihexylaminodiphenyl ether, 4,4'-diheptylaminodiphenyl ether, 4,4'-dioctylaminodiphenyl ether, 4,4'-dinonylaminodiphenyl ether, 4,4'-didecylaminodiphenyl ether, 4,4'-diundecylaminodiphenyl ether, 4,4'-didodecylaminodiphenyl ether, 4,4' - ditridecylaminodiphenyl ether, 4,4' - ditetradecylaminodiphenyl ether, 4,4' - dipentadecylaminodiphenyl ether, 4,4'-dihexadecylaminodiphenyl ether, 4,4'-diheptadecylaminodiphenyl ether, 4,4'-dioctadecylaminodiphenyl ether, 4,4'-dinonadecylaminodiphenyl ether, 4,4'-dieicosylaminodiphenyl ether, etc. In general it is preferred that the alkyl groups are of secondary configuration as illustrated by compounds such as 4,4'-diisopropylaminodiphenyl ether, 4,4'-di-sec-butylaminodiphenyl ether, 4,4'-di-sec-amylaminodiphenyl ether, 4,4'-di-sec-hexylaminodiphenyl ether, 4,4'-di-sec-heptylaminodiphenyl ether, 4,4'-di-sec-octylaminodiphenyl ether, 4,4'-di - sec - nonylaminodiphenyl ether, 4,4' - di - sec - decylaminodiphenyl ether, 4,4'-di-sec-undecylaminodiphenyl ether, 4,4'-di-sec-dodecylaminodiphenyl ether, etc.

In another preferred embodiment the curing agent comprises a 2,4'-diaminodiphenyl ether and alkylated products thereof. Illustrative compounds in this class include 2,4'-diaminodiphenyl ether, 2,4'-dimethylaminodiphenyl ether, 2,4'-diethylaminodiphenyl ether, 2,4'-dipropylaminodiphenyl ether, 2,4' - dibutylaminodiphenyl ether, 2,4'-diamylaminodiphenyl ether, 2,4'-dihexylaminodiphenyl ether, 2,4'-diheptylaminodiphenyl ether, 2,4'-dioctylaminodiphenyl ether, 2,4' - dinonylaminodiphenyl ether, 2,4'-didecylaminodiphenyl ether, 2,4'-diundecylaminodiphenyl ether, 2,4'-didodecylaminodiphenyl ether, 2,4' - ditridecylaminodiphenyl ether, 2,4' - ditetradecylaminodiphenyl ether, 2,4' - dipentadecylaminodiphenyl ether, 2,4'-dihexadecylaminodiphenyl ether, 2,4'-diheptadecylaminodiphenyl ether, 2,4'-dioctadecylaminodiphenyl ether, 2,4'-dinonadecylaminodiphenyl ether, 2,4'-dieicosylaminodiphenyl ether, etc. Generally it is preferred that the alkyl groups are of secondary configuration as illustrated by compounds such as 2,4'-diisopropylaminodiphenyl ether, 2,4'-di-sec-butylaminodiphenyl ether, 2,4'-di-sec-amylaminodiphenyl ether, 2,4'-di-sec-hexylaminodiphenyl ether, 2,4' - di - sec - heptylaminodiphenyl ether, 2,4'-di-sec-octylaminodiphenyl ether, 2,4'-di-sec-nonylaminodiphenyl ether, 2,4' - di - sec - decylaminodiphenyl ether, 2,4'-di-sec-undecylaminodiphenyl ether, etc.

In another embodiment the inhibitor comprises a diaminodiphenyl sulfide and alkylated products thereof. Illustrative compounds in this class include 4,4'-diaminodiphenyl sulfide, 4,4' - dimethylaminodiphenyl sulfide, 4,4'-diethylaminodiphenyl sulfide, 4,4'-dipropylaminodiphenyl sulfide, 4,4'-dibutylaminodiphenyl sulfide, 4,4'-diamylaminodiphenyl sulfide, 4,4'-dihexylaminodiphenyl sulfide, 4,4'-diheptylaminodiphenyl sulfide, 4,4'-dioctylaminodiphenyl sulfide, 4,4'-dinonylaminodiphenyl sulfide, 4,4'-didecylaminodiphenyl sulfide, 4,4'-diundecylaminodiphenyl sulfide, 4,4'-didodecylaminodiphenyl sulfide, 4,4' - ditridecylaminodiphenyl sulfide, 4,4' - ditetradecylaminodiphenyl sulfide, 4,4'-dipentadecylaminodiphenyl sulfide, 4,4'-dihexadecylaminodiphenyl sulfide, 4,4'-diheptadecylaminodiphenyl sulfide, 4,4'-dioctadecylaminodiphenyl sulfide, 4,4'-dinonadecylaminodiphenyl sulfide, 4,4'-dieicosylaminodiphenyl sulfide, etc. In general it is preferred that the alkyl groups are of secondary configuration as illustrated by compounds such as 4,4'-diisopropylaminodiphenyl sulfide, 4,4'-di - sec - butylaminodiphenyl sulfide, 4,4'-di-sec-amylaminodiphenyl sulfide, 4,4'-di-sec-hexylaminodiphenyl sulfide, 4,4'-di-sec-heptylaminodiphenyl sulfide, 4,4' - di - sec - octylaminodiphenyl sulfide, 4,4'-di-sec-nonylaminodiphenyl sulfide, 4.4'-di-sec-decylaminodiphenyl sulfide, 4,4'-di-sec-undecylaminodiphenyl sulfide, 4,4'-di-sec-dodecylaminodiphenyl sulfide, etc.

In another embodiment the curing agent comprises a 2,4'-diaminodiphenyl sulfide and alkylated products thereof. Illustrative compounds in this class include 2,4'-diaminodiphenyl sulfide, 2,4'-dimethylaminodiphenyl sulfide, 2,4'-diethylaminodiphenyl sulfide, 2,4'-dipropylaminodiphenyl sulfide, 2,4'-dibutylaminodiphenyl sulfide, 2,4'-diamylaminodiphenyl sulfide, 2,4'-dihexylaminodiphenyl sulfide, 2,4'-diheptylaminodiphenyl sulfide, 2,4'-dioctylaminodiphenyl sulfide, 2,4'-dinonylaminodiphenyl sulfide, 2,4'-didecylaminodiphenyl sulfide, 2,4'-diundecylaminodiphenyl sulfide, 2,4'-didodecylaminodiphenyl sulfide, 2,4'-ditridecylaminodiphenyl sulfide, 2,4'-ditetradecylaminodiphenyl sulfide, 2,4'-dipentadecylaminodiphenyl sulfide, 2,4'-dihexadecylaminodiphenyl sulfide, 2,4'-diheptadecylaminodiphenyl sulfide, 2,4'-dioctadecylaminodiphenyl sulfide, 2,4'-dinonadecylaminodiphenyl sulfide, 2,4'-dieicosylaminodiphenyl sulfide, etc. In general it is preferred that the alkyl groups are of secondary configuration as illustrated by compounds such as 2,4'-diisopropylaminodiphenyl sulfide, 2,4'-di-sec-butylaminodiphenyl sulfide, 2,4'-di-sec-amylaminodiphenyl sulfide, 2,4'-di-sec-hexylaminodiphenyl sulfide, 2,4'-di-sec-heptylaminodiphenyl sulfide, 2,4'-di-sec-octylaminodiphenyl sulfide, 2,4'-di-sec-nonylaminodiphenyl sulfide, 2,4'-di-sec-decylaminodiphenyl sulfide, 2,4'-di-sec-undecylaminodiphenyl sulfide, 2,4'-di-sec-dodecylaminodiphenyl sulfide, etc.

In general it is preferred that the dialkylaminodiphenyl ether and dialkylaminodiphenyl sulfide comprise symmetrical compounds (that is, the alkyl groups are of the same configuration and chain lengths). However, in some cases, the alkyl groups may be different in either the number of carbon atoms or in the configuration thereof, or both, and preferably are selected from the alkyl groups hereinbefore set forth.

In another embodiment the hydrocarbon radicals attached to the nitrogen atoms may comprise alkenyl groups. The alkenyl groups correspond to the alkyl groups hereinbefore set forth.

In still another embodiment the diamino- or dialiphaticaminodiphenyl ethers or sulfides may contain one or more hydrocarbon, hydrocarbon-substituted or non-hydrocarbon groups attached to one or both of the phenyl rings. The hydrocarbon substituents preferably are selected from alkyl groups including methyl, ethyl, propyl, butyl, amyl, hexyl, heptyl, octyl, nonyl, decyl, undecyl, dodecyl, etc. The substituted hydrocarbon groups may contain oxygen, nitrogen, sulfur and/or halogen and particularly chlorine. The non-hydrocarbon groups are selected from oxygen, nitrogen, sulfur and/or halogen and particularly chlorine. The substituents preferably are in the positions para and/or ortho to the oxygen or sulfur atom connecting the phenyl rings. Illustrative examples containing chlorine as a substituent include 2-chloro-4,4'-diaminodiphenyl ether, 2,2'-dichloro-4,4'-diaminodiphenyl ether, 4-chloro-2,4'-diaminodiphenyl ether, 2,4'-dichloro-2',4-diaminodiphenyl ether, etc., 2-chloro-4,4'-diaminodiphenyl sulfide, 2,2'-dichloro-4,4'-diaminodiphenyl sulfide, 4-chloro-2,4'-diaminodiphenyl sulfide, 2,4'-dichloro-2',4-diaminodiphenyl sulfide, etc.

From the above description, it will be noted that a number of different curing agents may be used in accordance with the present invention. It is understood that the different curing agents are not necessarily equivalent in the same or different epoxy resins. The selection of the specific curing agent to be employed will depend upon the specific epoxy resin and upon the final product desired. Certain of the agents will be more effective in some epoxy resins, while others will be more effective in other epoxy resins. Furthermore, in the preparation of the curing agents a mixture of isomers may be produced and, in certain cases, the mixture is used as such, thereby avoiding the additional time and expense of separating the individual compounds from the mixture.

In addition to the fact that the curing agents of the present invention are particularly effective for the purpose, the curing agents offer several important advantages over those disclosed in the prior art. In the first place, the curing agents of the present invention either are nontoxic or are of decreased toxicity. It is apparent that this is of considerable advantage because of reduced hazard to the workers handling the curing agent and to the workers or users of the cured epoxy resins. Another important advantage to the curing agents of the present invention is that they are of increased solubility in the resin mix and this, in turn, facilitates intimate mixing of the curing agent and epoxy resins.

Curing of the epoxy resins is effected in any suitable manner. The temperature and time of heating and concentration of curing agent will depend upon the specific epoxy resin employed and upon the pot life desired. The properties of the epoxy resin itself depend upon the number of epoxy groups in the resin and the method of manufacture. In general, the concentration of curing agent may range from about 5 to about 200% by weight of the resin, but usually will be within the range of from about 5 to about 100% by weight of the resin. The specific curing procedure will depend upon the particular application of the epoxy resin. In one embodiment, the curing agent may be commingled with the epoxy resin and the mixture heated to a temperature which will give a pot life of from about 0.5 to 1 hour or more, and the mixture then is placed in suitable molds and allowed to set into the desired pattern. In another embodiment the curing agent is mixed with the epoxy resin and the mixture used as bonding agents in laminates which may be heated and pressed at the same time, or the heating may precede the pressing, in which case the heating is controlled to give a sufficient pot life to allow application of the mixture to the laminate. It is understood that any suitable method of effecting the curing may be employed and, as hereinbefore set forth, the specific procedure will depend upon the particular application of the epoxy resin.

When desired, a suitable solvent, filler, thixotropping agent, diluent, etc., may be incorporated in the epoxy resin and/or the curing agent prior to curing. When the resin is supplied as a solid, it may be dissolved in a suitable solvent, and the curing agent intimately admixed therein. Any suitable solvent may be employed. Illustrative solvents include ketones as acetone, methylethyl ketone, methylisobutyl ketone, isophorone, diacetone alcohol, etc., ether alcohols as methyl, ethyl or butyl ether of ethylene glycol or diethylene glycol, Cellosolve, etc., chlorinated solvents such as trichloropropane, trichlorobutane, chloroform, etc. The filler to be employed will depend upon the purpose for which the epoxy resin is to be used. Illustrative fillers include powdered metals and metal oxides such as powdered iron oxide, aluminum oxide, etc., copper, aluminum, etc., silica, inorganic silicates, sand, glass, asbestos, carbon, calcium carbonate, etc. In order to prevent the filler from settling during curing, an organophilic thixotropping agent may be employed and this may be selected from any of the suitable commercially available materials. Diluents such as hydrocarbons including, for example, benzene, toluene, xylene, ethylbenzene, cumene, etc., may be employed, particularly with liquid resins. This serves to reduce the viscosity and to increase the useful pot life without seriously affecting the final properties of the resin.

When desired, the epoxy resin, either with or without a solvent, may be heated mildly prior to admixing the curing agent therewith. The mild heating generally will be within the range of from about 23° to 60° C. or more. It is important that the curing agent be intimately mixed with the resin, and this may be accomplished by hand mixing using a paddle, particularly in batch preparations, by the use of a mechanically rotating blade in continuous or batch preparations, or in any suitable manner.

The temperature of curing will vary in the manner hereinbefore set forth, but usually will be within the range of from about 100° to 300° C., although in some cases higher or lower temperatures may be employed. The time of heating also will depend upon the particular epoxy resin and curing agent employed, as well as the use to be made of the resin. The time generally will be from about 10 minutes to 20 hours or more, depending upon whether it is a fast or slow cure. In general, shorter times are employed with higher temperatures and, likewise, longer times with lower temperatures. While the curing may be effected at atmospheric pressure, super-atmospheric pressure may be utilized in the curing and may range up to 100 pounds or more per square inch. The curing is an exothermic reaction and, when desired, means for controlling the heat of reaction may be employed.

The following examples are introduced to illustrate further the novelty and utility of the present invention but not with the intention of unduly limiting the same.

*Example I*

The epoxy resin used in this example is liquid at atmospheric conditions and has a viscosity at 25° C. of 50–150 poises. This resin is a diglycidyl ether of Bis-Phenol-A and has an epoxide value (grams of resin containing one gram-equivalent of epoxide) of 175–210.

The curing agent used in this example is 2,4'-diaminodiphenyl ether. One part by weight of 2,4'-diaminodiphenyl ether was intimately mixed with nine parts by weight of the epoxy resin described above, and the mixture was heated at 170° C. for 1.5 hours. After this time, the mixture set into a hard cure.

The epoxy resin without the curing agent will not set into a hard cure after heating in a similar manner.

*Example II*

The curing agent used in this example is 4,4'-diaminodiphenyl ether. One part by weight of this curing agent was admixed with nine parts by weight of another sample of the epoxy resin described in Example I. The mixture was heated at 170° C. for 1.5 hours. In this case a soft cure was obtained. When a hard cure is desired, a higher temperature and/or longer period of heating is employed as illustrated in Example IV.

*Example III*

The curing agent used in this example is 4,4'-diisopropylaminodiphenyl ether. One part by weight of this curing agent was admixed with nine parts by weight of another sample of the epoxy resin described in Example I, and the mixture heated at 170° C. for 1.5 hours. This resulted in a soft cure and, as hereinbefore set forth, when a hard cure is desired higher temperature and/or longer period of heating is employed.

*Example IV*

The curing agent used in this example is 4,4'-diaminodiphenyl ether and was used in the same manner as described in Example II except that the temperature of curing employed was 200° C. and the time of heating 18 hours. Curing in this manner resulted in a hard cure.

*Example V*

The curing agent used in this example is 2,4'-diamino-4-chlorodiphenyl ether. One part by weight of this curing agent was admixed with nine parts by weight of another sample of the epoxy resin described in Example I. This curing was effected at 200° C. for 17 hours and resulted in a hard cure.

*Example VI*

The curing agent used in this example is 4,4'-diaminodiphenyl sulfide. One part by weight of this curing agent was intimately mixed with nine parts by weight of another sample of the epoxy resin described in Example I, and the mixture heated to 200° C. for 17 hours. A hard cure was obtained.

*Example VII*

The curing agent used in this example is 4,4'-diisopropylaminodiphenyl sulfide. When utilized in a concentration of 10% by weight of the final mix in another sample of the epoxy resin described in Example I and cured at 200° C. for 17 hours, a medium hard product was obtained. When a hard cure is desired, a higher temperature and/or longer period of heating is employed.

*Example VIII*

The curing agent used in this example is 2,4'-diamino-4-chlorodiphenyl sulfide. It is intimately mixed with an epoxy resin, in a concentration of 15% by weight of curing agent and 85% by weight of epoxy resin, and then heated at 180° C. The heating is continued to give a product having the desired pot life.

I claim as my invention:

1. A method of curing an epoxy resin formed by the reaction of epichlorhydrin and 2,2-bis-(4-hydroxyphenyl)-propane, which comprises heating said resin to a temperature of from about 100° to about 300° C. in admixture with from about 5% to about 200% by weight of a curing agent selected from the group consisting of a diaminodiphenyl ether, a diaminodiphenyl sulfide and alkylated derivatives thereof.

2. The method of claim 1 further characterized in that said curing agent is 4,4'-diaminodiphenyl ether.

3. The method of claim 1 further characterized in that said curing agent is 2,4'-diaminodiphenyl ether.

4. The method of claim 1 further characterized in that said curing agent is a 2,4'-dialkylaminodiphenyl ether.

5. The method of claim 1 further characterized in that said curing agent is 2,4'-di-sec-butylaminodiphenyl ether.

6. The method of claim 1 further characterized in that said curing agent is 4,4'-diaminodiphenyl sulfide.

7. The method of claim 1 further characterized in that said curing agent is 2,4'-diaminodiphenyl sulfide.

References Cited in the file of this patent

UNITED STATES PATENTS 2,773,048    Formo et al.     Dec. 4, 1956